United States Patent
Lee et al.

(10) Patent No.: US 8,306,120 B2
(45) Date of Patent: Nov. 6, 2012

(54) METHOD AND APPARATUS FOR PREDICTING MOTION VECTOR USING GLOBAL MOTION VECTOR, ENCODER, DECODER, AND DECODING METHOD

(75) Inventors: Tammy Lee, Seoul (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1089 days.

(21) Appl. No.: 11/964,820

(22) Filed: Dec. 27, 2007

(65) Prior Publication Data
US 2008/0159400 A1    Jul. 3, 2008

(30) Foreign Application Priority Data
Jan. 3, 2007  (KR) .................. 10-2007-0000708

(51) Int. Cl.
*H04N 7/12* (2006.01)
(52) U.S. Cl. ................................. 375/240.16
(58) Field of Classification Search .............. 375/240.16
See application file for complete search history.

(56) References Cited

U.S. PATENT DOCUMENTS

| | | | |
|---|---|---|---|
| 5,790,206 A | 8/1998 | Ju | |
| 7,394,853 B2 | 7/2008 | Kondo et al. | |
| 2003/0043912 A1* | 3/2003 | Sun et al. | 375/240.16 |
| 2003/0063673 A1 | 4/2003 | Riemens et al. | |
| 2003/0174776 A1* | 9/2003 | Shimizu et al. | 375/240.16 |
| 2004/0057520 A1 | 3/2004 | Sun | |
| 2005/0013369 A1* | 1/2005 | Lee | 375/240.16 |
| 2006/0280253 A1* | 12/2006 | Tourapis et al. | 375/240.16 |
| 2007/0286286 A1* | 12/2007 | Heng et al. | 375/240.16 |

FOREIGN PATENT DOCUMENTS

| | | |
|---|---|---|
| JP | 06113283 A | 4/1994 |
| JP | 2004072712 A | 3/2004 |
| KR | 2005-501491 A | 1/2005 |
| KR | 10-2006-0093074 A | 8/2006 |

OTHER PUBLICATIONS

Communication dated Jul. 24, 2012 issued by the Japanese Patent Office in counterpart Japanese Patent Application No. 2009-544783.

* cited by examiner

*Primary Examiner* — Anh-Vu Ly
*Assistant Examiner* — Matthew Hopkins
(74) *Attorney, Agent, or Firm* — Sughrue Mion, PLLC

(57) ABSTRACT

Provided are a method and apparatus for predicting a motion vector using a global motion vector, an encoder, a decoder, and a decoding method. The motion vector prediction method includes: predicting a global motion vector of the current block; calculating a first motion vector difference between a motion vector of the current block and a motion vector of the adjacent partition, and a second motion vector difference between the motion vector of the current block and the predicted global motion vector of the current block; and predicting, as the motion vector of the current block, a motion vector having a minimum Rate-Distortion (RD) cost, based on the first motion vector difference and the second motion vector difference.

21 Claims, 5 Drawing Sheets

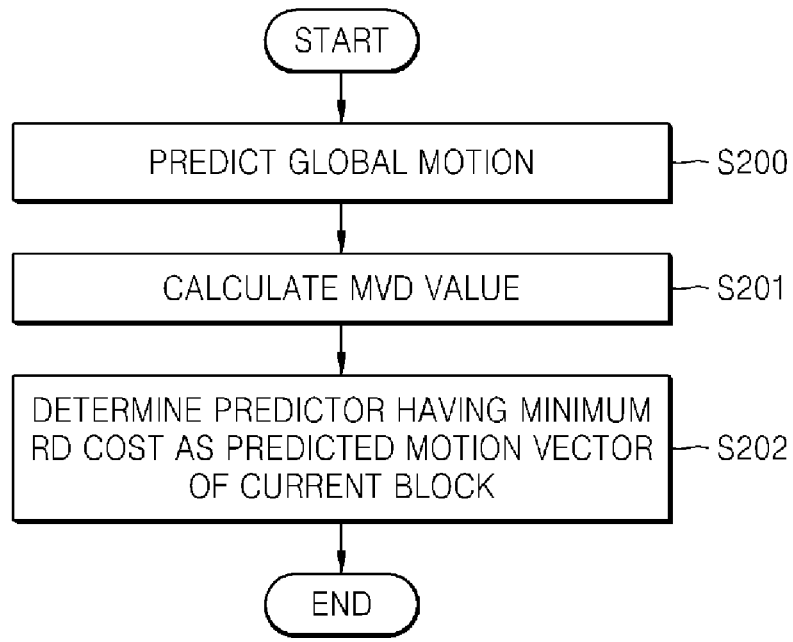
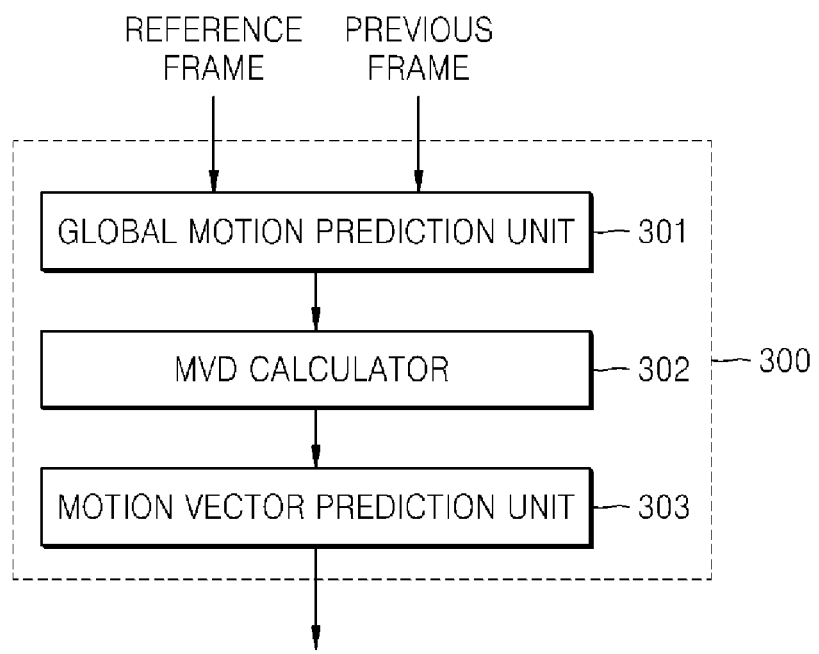

METHOD AND APPARATUS FOR PREDICTING MOTION VECTOR USING GLOBAL MOTION VECTOR, ENCODER, DECODER, AND DECODING METHOD

CROSS-REFERENCE TO RELATED PATENT APPLICATION

This application claims priority from Korean Patent Application No. 10-2007-0000708, filed on Jan. 3, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to video coding and decoding, and more particularly, to predicting a motion vector using a global motion vector.

2. Description of the Related Art

Inter-frame and intra-frame predictions are commonly used video encoding technologies. Intra-frame prediction is based on close correlation between gray levels of adjacent pixels in a single frame. Inter-frame prediction is based on similarities between successive frames in a video sequence. If no abrupt change appears in a moving picture screen, most areas of the moving picture do not change between successive frames. In particular, motion vector prediction is a video coding technique used in inter-frame prediction. Motion vector prediction is used to process images by differentially encoding motion vectors calculated by motion prediction. In general, a motion vector of a certain block has a close relationship with motion vectors of partitions adjacent to the block. Accordingly, by predicting a current block using its adjacent partitions and encoding only a difference vector between the current block and the adjacent partitions, it is possible to reduce the amount of bits that are to be encoded.

FIGS. 1A and 1B illustrate adjacent partitions which are used for motion prediction, according to a related art technique.

FIG. 1A shows a case where a current macroblock E and partitions A, B, and C adjacent to the current macroblock E have the same shape and size. In this case, prediction encoding of a motion vector of the current macroblock E is performed using motion vectors of the left block A, the upper block B, and the upper right block C of the current macroblock E, and a median value of the horizontal and vertical components of each motion vector.

FIG. 1B shows a case where a current macroblock E and partitions A, B, and C adjacent to the current macroblock E have different shapes and sizes. In this case, a motion vector of the current macroblock E is predicted by the following method.

(1) If an adjacent partition which is located at the left side of a macroblock E to be encoded is divided into several blocks, a block A which is the uppermost block among the several blocks is used for prediction. Also, if an adjacent partition which is located at the upper side of the macroblock E is divided into several blocks, a block B which is the leftmost block among the several blocks is used for prediction. Thereafter, prediction encoding of a motion vector of the macroblock E is performed using motion vectors of the block A, the block B, and the block C to the upper right of the macroblock E, and a median value of the horizontal and vertical components of each motion vector.

(2) If the macroblock E that is to be encoded is not a square, for example, if the macroblock E is a 16×8 or 8×16 pixel block, a motion vector of the macroblock E is predicted according to the size of a motion compensated block, using the following method, without using any median value.

(i) If the macroblock E that is to be encoded is a 16×8 pixel block, the blocks at the upper side of the macroblock E are predicted using the block B, and the blocks at the lower side of the macroblock E are predicted using the block A.

(ii) If the macroblock E that is to be encoded is an 8×16 pixel block, the blocks at the left of the macroblock E are predicted using the block A, and the blocks to the right of the block E are predicted using the block C.

(3) In the case of a skip macroblock mode, the above case (1) is applied.

As described above, a predicted motion vector (referred to as a "motion vector predictor") of a current block is defined as a median value of motion vectors of partitions adjacent to the current block. Accordingly, if a current block and its adjacent partition have different motions, a case where the motion vector of the adjacent partition has a Motion Vector Difference (MVD) value greater than that of the actual motion vector of the current block can occur. Accordingly, the amount of bits that are to be encoded can be further increased.

SUMMARY OF THE INVENTION

The present invention provides a method and apparatus for predicting a motion vector using a global motion vector, an encoder, a decoder, and a decoding method.

According to an aspect of the present invention, there is provided a method for predicting a motion vector of a current block using a motion vector of an adjacent partition adjacent to the current block, the method including: predicting a global motion vector of the current block; calculating a first motion vector difference between a motion vector of the current block and a motion vector of the adjacent partition, and a second motion vector difference between the motion vector of the current block and the predicted global motion vector of the current block; and predicting, as the motion vector of the current block, a motion vector having a minimum Rate-Distortion (RD) cost, on the basis of the first motion vector difference and the second motion vector difference.

In the predicting of the global motion vector of the current block, if a plurality of global motion vectors are obtained, the predicted global motion vector is determined to be the motion vector having the minimum RD, using a motion vector difference between each global motion vector and the motion vector of the current block.

The predicting of the global motion vector of the current block includes: dividing the current frame into a plurality of partitions having a predetermined size, and obtaining a plurality of motion vectors of the respective partitions; and calculating a median value of the motion vectors of the respective partitions, and predicting the median value as a global motion vector of the current block.

The predicting of the global motion vector of the current block includes: dividing the current frame into a plurality of partitions having a predetermined size, and obtaining a plurality of motion vectors of the respective partitions; and predicting a motion vector having a high frequency among the motion vectors of the respective partitions, as a predicted global motion vector of the current block.

The motion vector of the adjacent partition is a motion vector of a partition among a plurality of partitions adjacent to the current block, a median value of motion vectors of the plurality of partitions adjacent to the current block, or a temporal motion vector of the current block.

The method further includes transmitting motion information about the current block.

According to another aspect of the present invention, there is provided a computer-readable recording medium having embodied thereon a program for executing the method.

According to another aspect of the present invention, there is provided an apparatus for predicting a motion vector of a current block using a motion vector of an adjacent partition adjacent to the current block, the apparatus including: a global motion prediction unit predicting a global motion vector of the current block; a Motion Vector Difference (MVD) calculation unit calculating a first motion vector difference between the global motion vector of the current block and a motion vector of the adjacent partition, and a second motion vector difference between the motion vector of the current block and the global motion vector of the current block; and a motion vector prediction unit extracting a motion vector having a minimum RD cost from the first motion vector difference and the second motion vector difference, and determining the motion vector having the minimum RD cost as a predicted motion vector of the current block.

According to another aspect of the present invention, there is provided a video encoder including: a motion prediction unit generating a motion vector of a current block, and a plurality of motion vectors of a plurality of adjacent partitions adjacent to the current block; a motion vector prediction unit predicting a global motion vector of the current block, calculating a first motion vector difference between the motion vector of the current block and a motion vector of an adjacent partition adjacent to the current block, and a second motion vector difference between the motion vector of the current block and the global motion vector of the current block, determining from among the first motion vector difference and the second motion vector difference a motion vector having a minimum RD cost as a motion vector of the current block, and generating motion information of the motion vector of the current block and the predicted motion vector; and an entropy encoding unit entropy-encoding the motion information.

According to another aspect of the present invention, there is provided a video decoder including: an entropy decoder extracting motion information from a bit stream and entropy-decoding the motion information; a motion vector prediction unit reproducing a motion vector of a current block from the entropy-decoded motion information; and a macroblock restoring unit restoring the current block using the reproduced motion vector, wherein the motion information includes a motion vector difference between a motion vector of the current block and a predicted motion vector of the current block, and information about the predicted motion vector of the current block, and the predicted motion vector of the current block is a motion vector of an adjacent partition adjacent to the current block or a global motion vector of the current block.

According to another aspect of the present invention, there is provided a decoding method including: extracting motion information from a bit stream and entropy-decoding the motion information; reproducing a motion vector of a current block from the entropy-decoded motion information; a macroblock restoring unit restoring the current block using the reproduced motion vector, wherein the motion information includes a motion vector difference between a motion vector of the current block and a predicted motion vector of the current block, and information about the predicted motion vector of the current block, and the predicted motion vector of the current block is a motion vector of an adjacent partition adjacent to the current block or a global motion vector of the current block.

According to another aspect of the present invention, there is provided a computer-readable recording medium having embodied thereon a program for executing the method.

BRIEF DESCRIPTION OF THE DRAWINGS

The above and other aspects of the present invention will become more apparent by describing in detail exemplary embodiments thereof with reference to the attached drawings in which:

FIG. 2 is a flowchart of a motion vector prediction method according to an embodiment of the present invention;

FIG. 3 is a block diagram of a motion vector prediction apparatus according to an embodiment of the present invention;

DETAILED DESCRIPTION OF EXEMPLARY EMBODIMENTS OF THE INVENTION

Figure 1A:
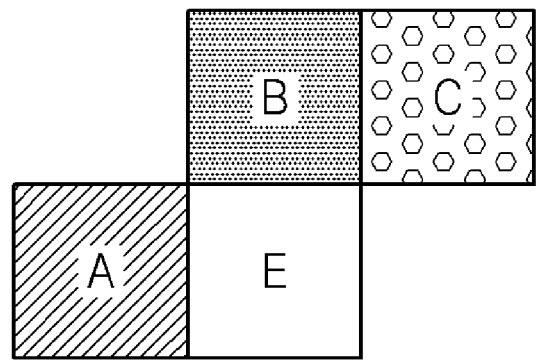
FIGS. 1A and 1B illustrate adjacent partitions which are used to predict a motion vector of a current block, according to a related art technique.

Hereinafter, embodiments of the present invention will be described in detail with reference to the appended drawings.

Like reference numerals in the drawings denote like elements. Also, in the following description, circuit components, etc., are specifically mentioned, however, they are provided to obtain a better understanding of the present invention. That is, it will be understood by those skilled in the art that the present invention can be implemented without such specific matters. In this specification, detailed descriptions related to functions or constructions well-known in the art, which may unnecessarily obscure the concept of the present invention, will be omitted.

FIG. 2 is a flowchart of a motion vector prediction method according to an embodiment of the present invention. Referring to FIG. 2, in operation S200, a global motion vector for a current block is predicted from image data of a reference frame and image data of a current frame. The reference frame is the previous frame of the current frame or the next frame of the current frame.

A method of predicting the global motion vector includes: (i) dividing the current frame into a plurality of partitions having a predetermined size; (ii) obtaining motion vectors of the respective partitions; and (iii) calculating a median value of the motion vectors of the respective partitions, and predicting the median value as a global motion vector.

Another method of predicting the global motion vector includes: (i) dividing a current frame into a plurality of partitions having a predetermined size; (ii) obtaining motion vectors of the respective partitions; and (iii) extracting a motion vector having a high frequency from the motion vectors of the respective partitions, and predicting the motion vector as a global motion vector.

In these methods, various motion models are selected and used. The various motion models include a translation model, an Affine model, a Projective model, etc. In the case of the translation model, two parameters are used as global motion information for generating a global motion vector. In the case of the Affine model, six parameters are used as global motion information for generating a global motion vector. Also, in the case of the Projection model, eight parameters are used as global motion information for generating a global motion vector. The motion models are examples, and the methods of predicting the global motion vector, as described above, are also examples. That is, the present invention is not limited to these methods, and it will be understood by one of ordinary skill in the art that well-known different methods can be used to predict a global motion vector.

When a plurality of global motion vectors are obtained, a motion vector having a minimum RD cost among the global motion vectors, i.e., a global motion vector, can be predicted. Sum of Absolute Difference (SAD), Sum of Absolute Transform Difference (SATD), Sum of Squared Difference (SSD), Mean of Absolute Difference (MAD), and a Lagrange function, other than the RD cost, can be used to predict a global motion vector. For example, the RD cost will be described in detail below. The "Rate" means a bit rate, and represents the number of bits used to encode a macroblock. That is, the "Rate" represents a sum of the number of bits obtained by encoding a residual signal, and the number of bits obtained by encoding motion vector information, after inter-prediction or intra-prediction is performed. The "Distortion" represents a difference between an original macroblock and its decoded version when the original macroblock is encoded and then decoded.

Figure 1B:
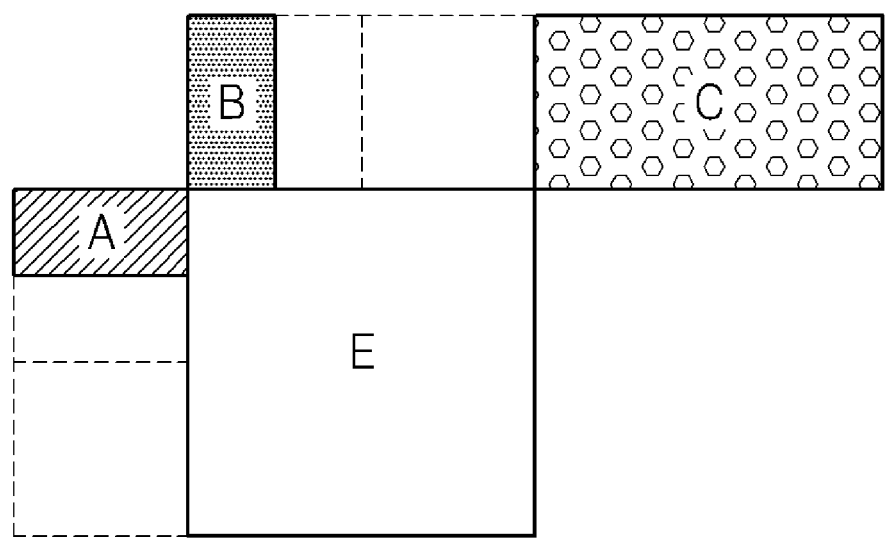

In operation S201, a Motion Vector Difference (MVD) value (also referred to as a first MVD value) of a motion vector of an adjacent partition is calculated, and an MVD value (also referred to as a second MVD value) of the global motion vector predicted in operation 200 is calculated based on the first MVD value. The motion vector of the adjacent partition may be a motion vector of one of adjacent partitions A, B, and C adjacent to a current block E, as illustrated in FIG. 1, a median value of motion vectors of the adjacent partitions A, B, and C, or a temporal motion vector of the current block E.

In operation S202, a motion vector having a minimum RD cost is extracted from the motion vectors of the adjacent partitions A, B and C, and predicted as a motion vector of the current block E, using the first MVD value calculated in operation S201. The predicted motion vector (also referred to as a motion vector predictor MVp) of the current block E may be the global motion vector obtained according to the first MVD value in operation S200, a motion vector of one of the adjacent partitions A, B, and C adjacent to the current block E, a median value of the motion vectors of the adjacent partitions A, B, and C adjacent to the current block E, or a temporal motion vector of the current block E.

Motion information related to the current block E may be encoded and then transmitted to a decoder. The motion information includes an MVD value obtained by subtracting the predicted motion vector predictor MVp of the current block E from the motion vector of the current block E, a global motion vector for each frame, and information (that is, a 1-bit flag representing a motion vector of an adjacent partition or a global motion vector) about the predicted motion vector of the current macroblock E.

FIG. 3 is a block diagram of a motion vector prediction apparatus 300 according to an embodiment of the present invention. The motion vector prediction apparatus 300 includes a global motion prediction unit 301, an MVD calculation unit 302, and a motion vector prediction unit 303.

Referring to FIG. 3, the global motion prediction unit 301 predicts a global motion vector from image data of a reference frame and image data of a current frame. The reference frame may be the previous or next frame of a temporally current frame. Methods of predicting the global motion vector have been described above.

The MVD calculation unit 302 calculates an MVD value (also referred to as a first MVD value) of a motion vector of an adjacent partition adjacent to the current frame, and calculates an MVD value (also referred to as a second MVD value) of the global motion vector predicted in operation 200.

The motion vector prediction unit 303 extracts a motion vector having a minimum RD cost from motion vectors of adjacent partitions, using the first MVD value calculated by the MVD calculation unit 302, and predicts the motion vector having the minimum RD cost as a motion vector of the current frame.

Figure 4:
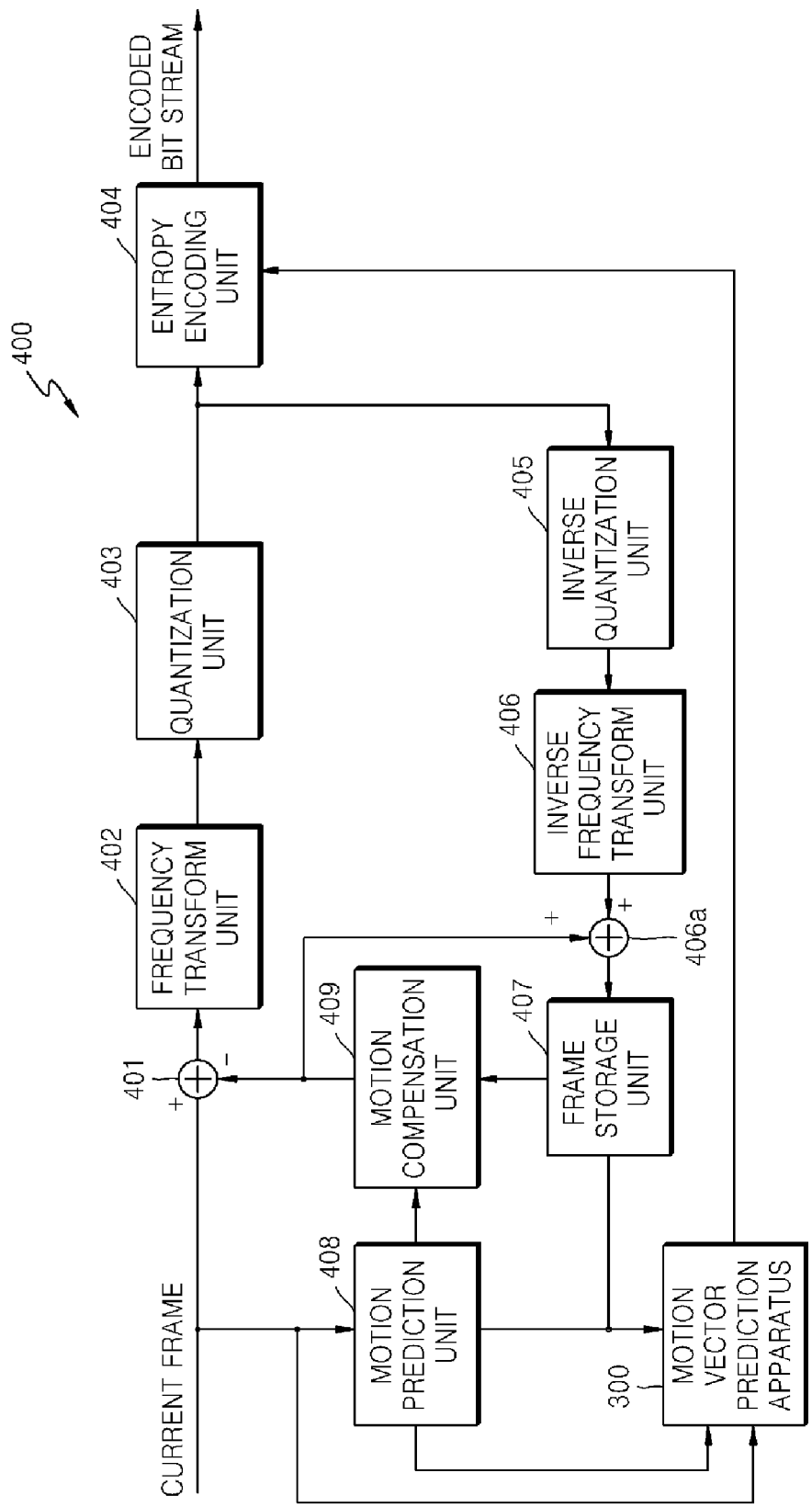
FIG. 4 is a block diagram of an encoder including the motion vector prediction apparatus, according to an embodiment of the present invention.

FIG. 4 is a block diagram of an encoder 400 including the motion vector prediction apparatus 300, according to an embodiment of the present invention.

Referring to FIG. 4, an adder 401 calculates a difference between image data of a current frame received from the outside and motion-compensated image data received from a motion compensation unit 409, and transfers the difference to a frequency transform unit 402. The image data may be block-based image data. If a current macroblock encoded by inter-mode coding is received from the outside, the adder 401 outputs a difference between image data of the current macroblock and a motion-compensated version of the image data, to the frequency transform unit 402.

The frequency transform unit 402 performs Discrete Cosine Transformation (DCT) on the image data received from the adder 401 to transform values of a spatial domain to values of a frequency domain, and outputs the values of the frequency domain to a quantization unit 403.

The quantization unit 403 quantizes the values of the frequency domain received from the frequency transform unit 402, and outputs the quantized values of the frequency domain to an entropy encoding unit 404.

The entropy transform unit 404 performs entropy-encoding on the quantized values of the frequency domain received from the quantization unit 403, and motion information received from the motion vector prediction unit 300, and generates a bit stream. The motion information includes an MVD value obtained by subtracting a predicted motion vector of the current macroblock from an actual motion vector of the current block, a global motion vector of each frame, and information (that is, a one-bit flag representing a motion vector of an adjacent partition or a global motion vector) about the predicted motion vector of the current block.

An inverse quantization unit 405, an inverse frequency transform unit 406, a frame storage unit 407, a motion prediction unit 408, a motion compensation unit 409, and the motion vector prediction apparatus 300, as illustrated in FIG. 4, are functional units for performing motion compensation.

The inverse quantization unit 405 performs inverse-quantization on the quantized values of the frequency domain received from the quantization unit 403, and outputs the inverse-quantized values of the frequency domain to the inverse frequency transform unit 406.

The inverse frequency transform unit 406 transforms the values of the frequency domain inverse-quantized by the inverse-quantization unit 405 to values of a spatial domain, and transfers the values of the spatial domain to an adder 406a.

The adder 406a adds the image data received from the motion compensation unit 409 to the values of the spatial domain received from the inverse frequency transform unit 406, and generates image data (that is, image data of a reference frame) which is referred to for motion compensation. The image data of the reference frame is stored in the frame storage unit 407.

The frame storage unit 407 stores the image data received from the adder 406a.

The motion prediction unit 408 performs motion prediction between the image data of the current macroblock received from the outside and the image data stored in the frame storage unit 407, thereby calculating motion vectors. The motion vectors calculated by the motion prediction unit 408 are transferred to the motion compensation unit 409 and the motion vector prediction apparatus 300.

The motion compensation unit 409 performs motion compensation on the reference frame stored in the frame storage unit 407, using the motion vectors calculated by the motion prediction unit 408, and generates motion-predicted image data. The motion-predicted image data is transferred to the adder 401 and the adder 406a.

The motion vector prediction apparatus 300, as illustrated in FIG. 3, includes the global motion prediction unit 301, the MVD calculation unit 302, and the motion vector prediction unit 303, and accordingly, a detailed description thereof will be omitted.

Figure 5:
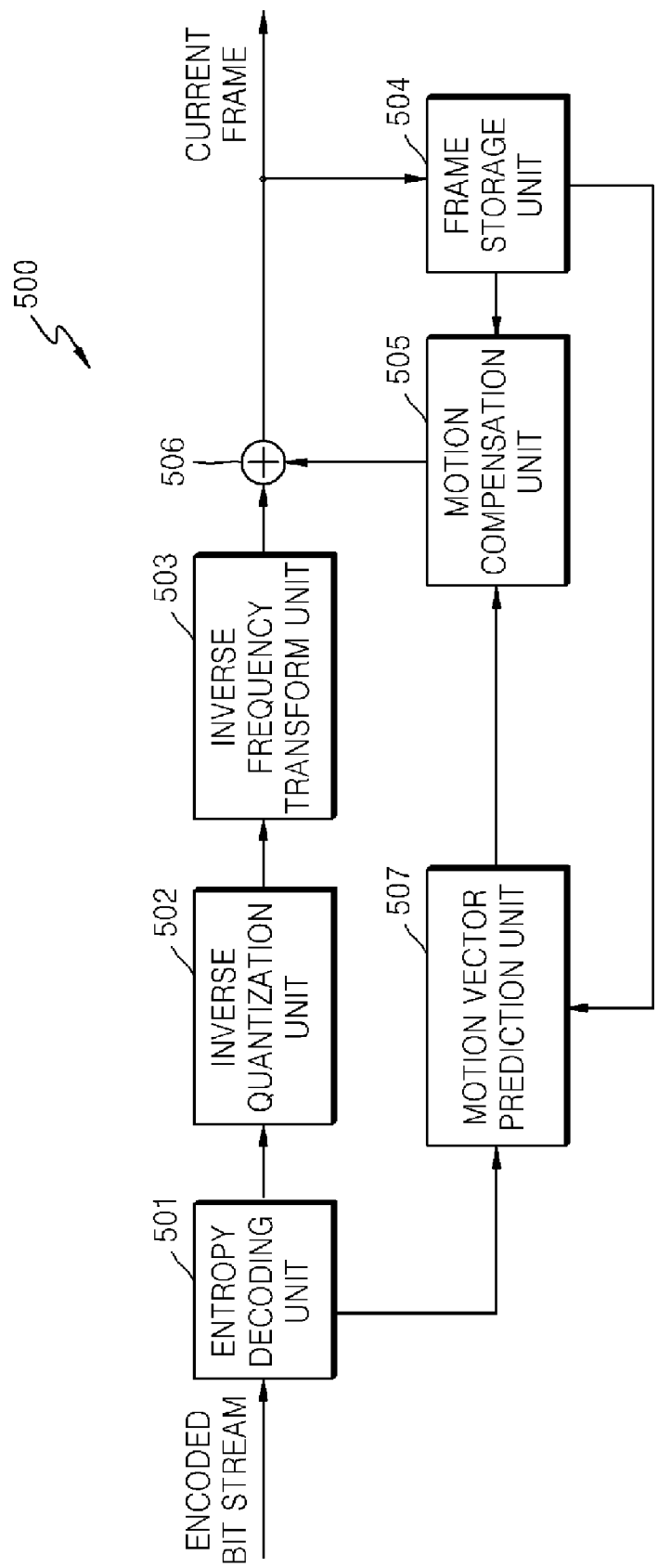
FIG. 5 is a block diagram of a decoder according to an embodiment of the present invention.

FIG. 5 is a block diagram of a decoder 500 according to an embodiment of the present invention. The decoder 500 includes an entropy decoding unit 501, an inverse quantization unit 502, an inverse frequency transform unit 503, a frame storage unit 504, a motion compensation unit 505, an adder 506, and a motion vector prediction unit 507. Meanwhile, the inverse quantization unit 502, the inverse frequency transform unit 503, the frame storage unit 504, the motion compensation unit 505, and the adder 506 form a macroblock restoring unit.

Referring to FIG. 5, the entropy decoding unit 501 performs entropy-decoding on a bit stream received from an encoder, and transfers the entropy-decoded bit stream to the inverse quantization unit 502 and the motion vector prediction unit 507. In particular, in the case of inter-mode coding, the entropy decoding unit 501 extracts a residual block and motion information about a current block from the bit stream received from an encoder, and outputs the extracted residual block to the inverse quantization unit 502 and outputs the extracted motion information to the motion vector prediction unit 507.

The motion information includes an MVD value obtained by subtracting a predicted motion vector of a current block from an actual motion vector of the current block, a global motion vector for each frame, and information (that is, a one-bit flag representing a motion vector of an adjacent motion vector or a global motion vector) about the predicted motion vector of the current block. The predicted motion vector of the current block is a global motion vector or a motion vector of a partition adjacent to the current block. Also, the motion vector of the adjacent partition is a motion vector of one of a plurality of partitions adjacent to the current block, a median value of motion vectors of partitions adjacent to the current block, or a temporal motion vector of the current block.

The inverse quantization unit 502 performs inverse quantization on the residual block entropy-decoded by the entropy decoding unit 501, and outputs the inverse-quantized residual block to the inverse frequency transform unit 503.

The inverse frequency transform unit 503 transforms the inverse-quantized residual block received from the inverse quantization unit 502 to values of a spatial domain, and outputs the values of the spatial domain to the adder 506.

The adder 506 adds the inverse-quantized residual block received from the inverse frequency transform unit 503, to the motion-compensated prediction block received from the motion compensation unit 505, and restores the current block.

The frame storage unit 504 stores the current block output from the adder 506.

The motion vector prediction unit 507 performs motion vector prediction on the motion information extracted by the entropy decoding unit 501, and restores motion vectors. The restored motion vectors are output to the motion compensation unit 505.

The motion compensation unit 505 applies the motion vectors received from the motion vector prediction unit 507 to image data of a reference frame stored in the frame storage unit 504, to perform motion compensation. As a result, the motion-compensated image data is output through the adder 506.

Figure 6:
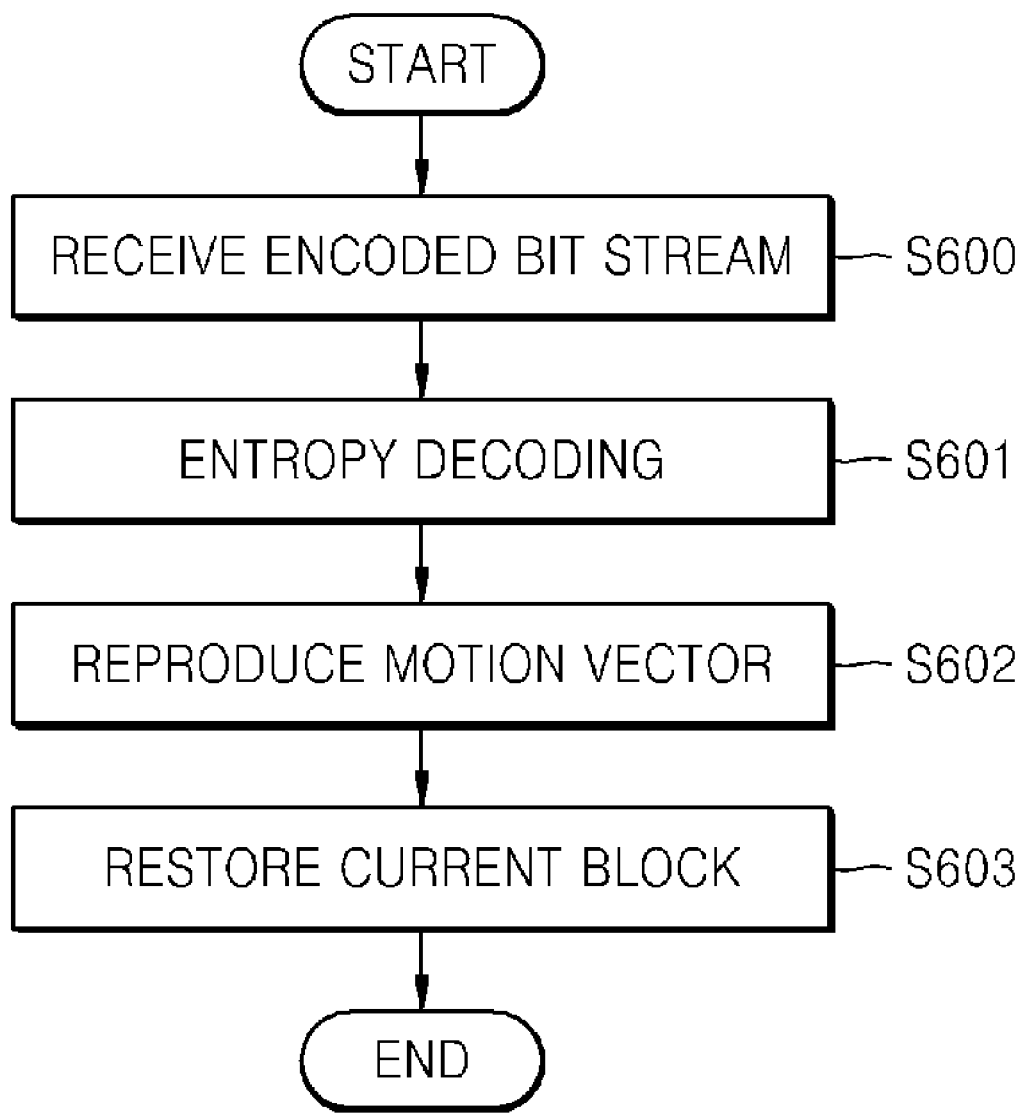
FIG. 6 is a flowchart of a decoding method according to an embodiment of the present invention.

FIG. 6 is a flowchart of a decoding method according to an embodiment of the present invention.

Referring to FIG. 6, in operation S600, an encoded bit stream is received, wherein the bit stream includes motion information about a current block and a residue block.

In operation 601, the bit stream is entropy-decoded. In the case of inter-mode coding, motion information about a current block and image data (that is, a residual block) are decoded. Also, as described above with reference to FIG. 5, the residual block is subjected to inverse-quantization and inverse frequency transformation.

In operation S602, a motion vector is reproduced from the encoded motion information.

In operation S603, the reproduced motion vector is applied to a reference block to generate a motion-compensated prediction block, and the motion-compensated prediction block is added to the residual block, thereby restoring the current block.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

As described above, by using a global motion vector as a motion vector predictor of a current block, it is possible to reduce the amount of information that is to be transmitted to a decoder. Also, it is possible to search for a better predictor under a limited amount of motion bits to facilitate motion prediction, and to achieve an excellent peak signal to noise ratio (PSNR). Also, according to the present invention, it is possible to more correctly predict a motion of a current block when the motion of the current block is different from the motions of partitions adjacent to the current block.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for predicting a motion vector of a current block using a motion vector of an adjacent partition that is adjacent to the current block, the method comprising:
    predicting a global motion vector of the current block;
    calculating a first motion vector difference between a motion vector of the current block and a motion vector of the adjacent partition, and a second motion vector difference between the motion vector of the current block and the predicted global motion vector of the current block;
    predicting, as the motion vector of the current block, a motion vector having a minimum Rate-Distortion (RD) cost, based on the first motion vector difference and the second motion vector difference; and
    generating motion information related to the current block and transmitting the motion information,
    wherein the motion information related to the current block includes a motion vector difference between the motion vector of the current block and the predicted motion vector of the current block, a global motion vector for each frame of the current block, and information about the predicted motion vector of the current block, and
    wherein the predicted motion vector of the current block is a motion vector of an adjacent partition adjacent to the current block or a global motion vector of the current block.

2. The method of claim 1, wherein, in the predicting the global motion vector of the current block, if a plurality of global motion vectors are obtained, the predicted global motion vector is determined to be the motion vector having the minimum RD, using a motion vector difference between each of the plurality of global motion vectors and the motion vector of the current block.

3. The method of claim 1, wherein the predicting the global motion vector of the current block comprises:
    dividing the current frame into a plurality of partitions having a predetermined size, and obtaining a plurality of motion vectors of the respective partitions; and
    calculating a median value of the motion vectors of the respective partitions, and predicting the median value as the global motion vector of the current block.

4. The method of claim 1, wherein the predicting the global motion vector of the current block comprises:
    dividing the current frame into a plurality of partitions having a predetermined size, and obtaining a plurality of motion vectors of the respective partitions; and
    predicting a motion vector having a high frequency among the motion vectors of the respective partitions, as the global motion vector of the current block.

5. The method of claim 4, wherein the motion vector of the adjacent partition is one of a motion vector of a partition among a plurality of partitions adjacent to the current block, a median value of motion vectors of the plurality of partitions adjacent to the current block, and a temporal motion vector of the current block.

6. A non-transitory computer-readable recording medium having embodied thereon a program for executing the method of claim 1.

7. An apparatus for predicting a motion vector of a current block using a motion vector of an adjacent partition that is adjacent to the current block, the apparatus comprising:
    a global motion prediction unit which predicts a global motion vector of the current block;
    a Motion Vector Difference (MVD) calculation unit which calculates a first motion vector difference between the global motion vector of the current block and a motion vector of the adjacent partition, and a second motion vector difference between the motion vector of the current block and the global motion vector of the current block; and
    a motion vector prediction unit which extracts a motion vector having a minimum Rate-Distortion (RD) cost from the first motion vector difference and the second motion vector difference, determines the motion vector having the minimum RD cost as a predicted motion vector of the current block, generates motion information related to the current block, and transmits the motion information,
    wherein the motion information related to the current block includes a motion vector difference between the motion vector of the current block and the predicted motion vector of the current block, a global motion vector for each frame of the current block, and information about the predicted motion vector of the current block, and
    wherein the predicted motion vector of the current block is a motion vector of an adjacent partition adjacent to the current block or a global motion vector of the current block.

8. The apparatus of claim 7, wherein, when a plurality of global motion vectors are obtained, the global motion prediction unit extracts the motion vector having the minimum RD cost from a motion vector difference between each global motion vector and the motion vector of the current block, and determines the motion vector having the minimum RD cost as the global motion vector of the current block.

9. The apparatus of claim 7, wherein the global motion prediction unit divides a current frame into a plurality of partitions having a predetermined size, obtains a plurality of motion vectors of the respective partitions, calculates a median value of the motion vectors of the respective partitions, and determines the median value as the global motion vector of the current block.

10. The apparatus of claim 7, wherein the global motion prediction unit divides the current frame into a plurality of partitions having a predetermined size, obtains a plurality of motion vectors of the respective partitions, and among the motion vectors of the respective partitions, determines a motion vector having a high frequency as the global motion vector of the current block.

11. The apparatus of claim 7, wherein the motion vector of the adjacent partition is a motion vector of a partition among a plurality of partitions adjacent to the current block, a median value of motion vectors of the plurality of partitions adjacent to the current block, or a temporal motion vector of the current block.

12. A video encoder comprising:
    a motion prediction unit which generates a motion vector of a current block, and a plurality of motion vectors of a plurality of adjacent partitions adjacent to the current block;
    a motion vector prediction unit which predicts a global motion vector of the current block, calculates a first motion vector difference between the motion vector of the current block and a motion vector of an adjacent partition adjacent to the current block, and a second motion vector difference between the motion vector of the current block and the global motion vector of the current block, determines from among the first motion vector difference and the second motion vector difference a motion vector having a minimum Rate-Distortion (RD) cost as a motion vector of the current block, generates motion information of the motion vector of the current block and the predicted motion vector, and transmits the motion information; and an entropy encoding unit which entropy-encodes the motion information, wherein the motion information related to the current block includes a motion vector difference between the motion vector of the current block and the predicted motion vector of the current block, a global motion vector for each frame of the current block, and information about the predicted motion vector of the current block, and wherein the predicted motion vector of the current block is a motion vector of an adjacent partition adjacent to the current block or a global motion vector of the current block.

13. The encoder of claim 12, wherein, when a plurality of global motion vectors are obtained, the motion vector prediction unit determines a motion vector having a minimum RD cost as the global motion vector, from a motion vector difference between each of the plurality of global motion vectors and the motion vector of the current block.

14. The encoder of claim 12, wherein the motion vector prediction unit divides a current frame into a plurality of partitions having a predetermined size, obtains a plurality of motion vectors of the respective partitions, calculates a median value of the motion vectors of the respective partitions, and determines the median value as the global motion vector.

15. The encoder of claim 12, wherein the motion vector prediction unit divides a current frame into a plurality of partitions having a predetermined size, obtains a plurality of motion vectors for the respective partitions, and among the motion vectors of the respective partitions, determines a motion vector having a high frequency as the global motion vector.

16. The encoder of claim 12, wherein the motion vector of the adjacent partition is a motion vector of a partition among a plurality of partitions adjacent to the current block, a median value of motion vectors of the plurality of partitions adjacent to the current block, or a temporal motion vector of the current block.

17. A video decoder comprising:
an entropy decoder which extracts motion information related to a current block from a bit stream and entropy-decoding the motion information;
a motion vector prediction unit which reproduces a motion vector of the current block from the entropy-decoded motion information; and
a macroblock restoring unit which restores the current block using the reproduced motion vector, wherein the motion information related to the current block includes a motion vector difference between a motion vector of the current block and a predicted motion vector of the current block, a global motion vector for each frame of the current block, and information about the predicted motion vector of the current block, and the predicted motion vector of the current block is a motion vector of an adjacent partition adjacent to the current block or a global motion vector of the current block.

18. The decoder of claim 17, wherein the motion vector of the adjacent partition adjacent to the current block is a motion vector of a partition among a plurality of partitions adjacent to the current block, a median value of motion vectors of the plurality of partitions adjacent to the current block, or a temporal motion vector of the current block.

19. A decoding method comprising:
extracting motion information related to a current block from a bit stream and entropy-decoding the motion information;
reproducing a motion vector of the current block from the entropy-decoded motion information;
a macroblock restoring unit restoring the current block using the reproduced motion vector,
wherein the motion information related to the current block includes a motion vector difference between a motion vector of the current block and a predicted motion vector of the current block, a global motion vector for each frame of the current block, and information about the predicted motion vector of the current block, and the predicted motion vector of the current block is a motion vector of an adjacent partition adjacent to the current block or a global motion vector of the current block.

20. The method of claim 19, wherein the motion vector of the adjacent partition adjacent to the current block is a motion vector of a partition among a plurality of partitions adjacent to the current block, a median value of motion vectors of the plurality of partitions adjacent to the current block, or a temporal motion vector of the current block.

21. A non-transitory computer-readable recording medium having embodied thereon a program for executing the method of claim 19.

* * * * *